INVENTORS
DAVID F. ANDERSON
DONALD G. PEDROTTI

BY *Roger S. Borovoy*

ATTORNEY

Sept. 3, 1968  D. G. PEDROTTI ETAL  3,400,223
MULTIPLE INPUT CONTROL SYSTEM WITH SINGLE AMPLIFIER
Filed Dec. 10, 1964  2 Sheets-Sheet 2

INVENTORS
DAVID F. ANDERSON
DONALD G. PEDROTTI
BY
ATTORNEY

United States Patent Office 3,400,223
Patented Sept. 3, 1968

3,400,223
MULTIPLE INPUT CONTROL SYSTEM WITH
SINGLE AMPLIFIER
Donald G. Pedrotti, Cupertino, and David F. Anderson,
Santa Clara, Calif., assignors to RCK, Incorporated,
Sunnyvale, Calif., a corporation of California
Filed Dec. 10, 1964, Ser. No. 417,363
6 Claims. (Cl. 179—15)

ABSTRACT OF THE DISCLOSURE

A multiple input control system, for use in furnaces and the like, having a plurality of input terminals, one for receiving each controlled signal and comparing it with a reference signal. A deviation signal is generated from each input signal and passed through a selector into an amplifier. The amplified deviation signal is then integrated and the integrated value used to adjust the apparatus, such as a furnace, through a control.

---

This invention relates to a multiple input control system used for maintaining a plurality of input signals at a predetermined level. More particularly the invention provides a system wherein a single amplifier can be used to sequentially control a series of input signals, and maintain each one at a predetermined, constant signal level.

In the past, multiplex signal control systems have been used for example in steel mills to control temperatures of a plurality of furnaces, such as anneal furnaces. Such a system detects the temperatures sensed by each of a plurality of thermocouples, each located in a different furnace. Because of the very low signal level of the output voltage of a thermocouple, a separate preamplifier is used at each furnace located for each thermocouple. The preamplified temperature-indicating signal from each thermocouple is sent to a scanning system. The scanning system chooses one preamplified output signal from one thermocouple at a time. The preamplified output of the thermocouple is passed through the scanner and then set to a conventional amplifier, wherein the preamplified temperature-indicating signal from the scanner reaches a still higher signal level. This amplified signal is compared with a predetermined signal selected to be the same level as the signal from the amplifier would be if the furnace being sensed were at the proper temperature. If a difference in level appears between these two signals, an output signal will be transmitted to the furnace being sensed. This output signal is used to adjust the furnace temperature in the direction indicated by the polarity of the difference in levels between the output of the amplifier and the predetermined signal.

In prior art systems of this nature, it is essential that all the preamplifiers and the power amplifier be linear. If not, their output signal is not proportional to their input signal. Accordingly, a deviation may occur from the predetermined signal level resulting from the non-linearity, whereas in fact the furnace was at the proper temperature. Accordingly, in systems of the prior art, amplifier characteristics—both preamplifier and power amplifier—are extremely critical.

This invention provides apparatus for controlling a plurality of signals using a single amplifier. Contrary to the prior art, the apparatus of this invention requires no preamplifiers for the individual input signals. The apparatus of this invention comprises: a plurality of input terminals, one for receiving each signal to be controlled; a plurality of signal sources, each having a predetermined constant signal level; a plurality of deviation signal sources for comparing the signal received at each input terminal with the signal level of one signal source, and for developing a deviation signal proportional to the deviation of the signal level received at the input terminal from the predetermined constant signal level of one of the signal sources; a first selecting means coupled to the output of each of the deviation signal sources for selecting in rotation one such deviation signal from one of the deviation signal sources at a time; an amplifying means; a means for directly coupling the selected unamplified deviation signal to the amplifying means; a means for monitoring the level of the selected deviation signal to be controlled by an amount proportional to the monitored deviation signal, thereby maintaining a rotation each signal to be controlled at a constant level proportional to a constant signal source.

The elimination of the preamplifiers, and the resulting direct coupling of the deviation signal to the power amplifier through the scanner (the selecting means) in this invention completely eliminates the common errors occurring in prior art systems as a result of preamplifier deviations. Moreover, even the power amplifier used in the subject invention (the amplifying means) is not critical. Since the deviation signal is achieved prior to amplification, non-linearities in the power amplifier do not affect the deviation signal. It will be observed that the output of the power amplifier is proportional to the deviation signal even when non-linearities occur within it.

A further advantage of the system of this invention is that the amplifier can tolerate high noise levels, e.g., 30 microvolts, even though the signal from the input terminal, coming from the thermocouple or other transducer, may be as low as 1 microvolt. This high toleration for noise levels results from the integrating technique used at the output stage upon the deviation signal from the power amplifier. This integration provides a signal level proportional to the amount of deviation from the constant signal source of the signal received at the selected input terminal (from a transducer or the like). Because of this integration, noise, which is either positive or negative, will cancel out, leaving only the desired signal.

A preferred embodiment of a system of this invention couples and decouples the amplifier during the rotation of the scanner from one input to the next. This eliminates any transient signals which may result from this switching. A preferred embodiment of the invention also provides a gain scanner to select different gain for the power amplifier corresponding to the particular input signal selected by the input scanner. The gain scanner is normally coupled to the input scanner.

Finally, in another embodiment of the invention, a means is provided to supply a null input signal to the power amplifier. At the same time an additional integrating means at the output is connected by the output scanner to the output of the amplifier and to the input of the amplifier when the null input signal is supplied to the input of the amplifier. This additional integrating means provides a signal level proportional to the output of the amplifier when the null input signal is applied. If this output is other than zero, a means coupled to this bias-adjusting means of the amplifier will adjust the bias of the amplifier towards a zero output in response to the null input signal. Accordingly, during each cycle of the scanner, the amplifier is continually monitored and adjusted so that it will provide a null output for a null input, thus providing automatic amplifier calibration.

Other advantages of the various embodiments of this invention will be more fully described in the detailed description of the invention which follows, making reference to the drawings, in which.

Figure 1:
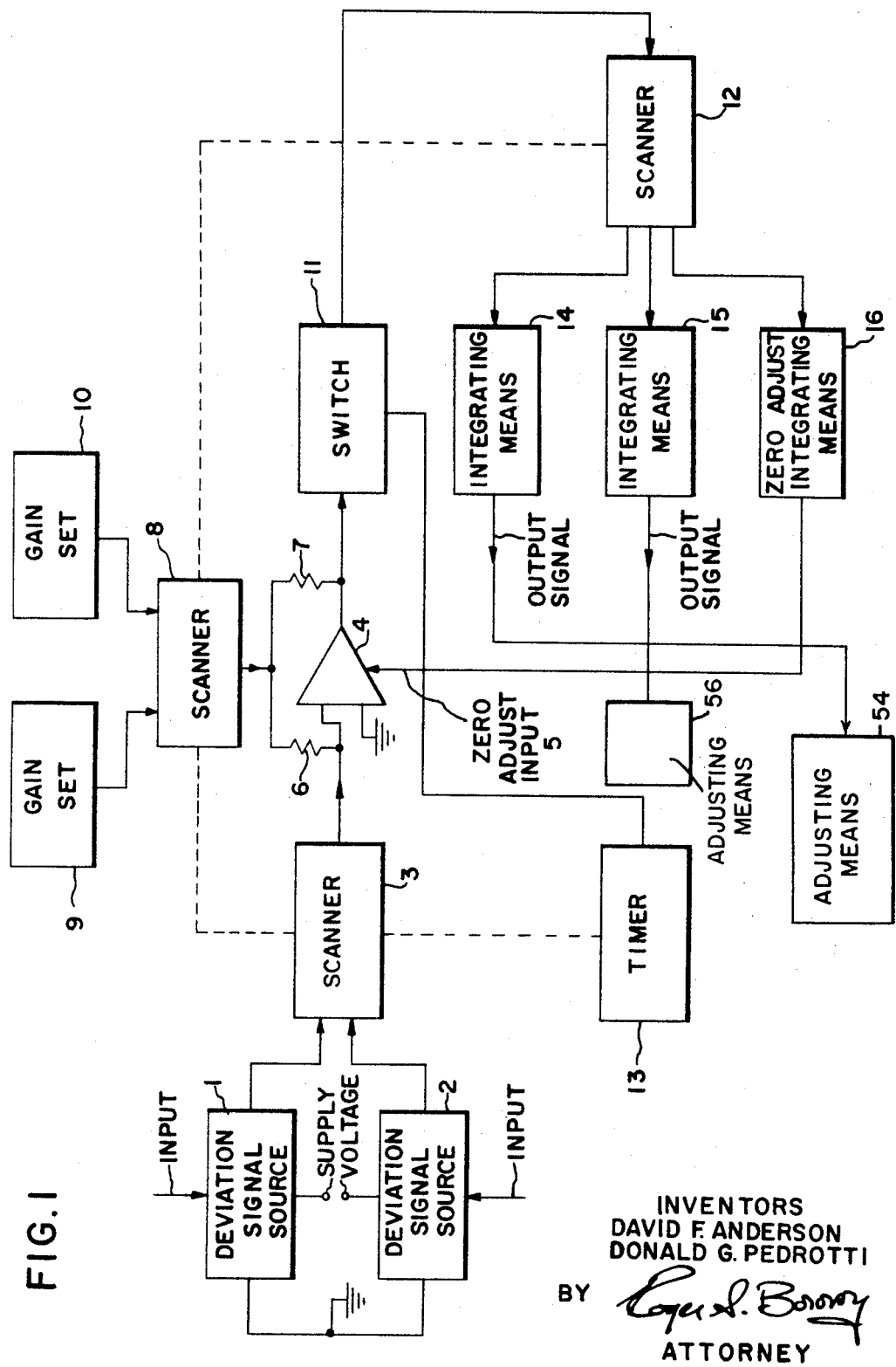
FIG. 1 is a somewhat schematic block diagram of the system of this invention.

Referring to FIG. 1, the block diagram shown illustrates the control system of this invention. The system operates from a plurality of input signals supplied from any desired source. For example, such an input signal can be derived from a transducer, such as a thermocouple or a strain gauge, or other input signal supply. The input signal may therefore be either a current or voltage which may vary from time to time in response to a change in conditions of the system being controlled. It is the function of the apparatus of this invention to maintain the input signals as close to constant as possible. In the illustrated embodiment in FIG. 1, two input signals are used; the first enters deviation signal source 1 as shown; the second enters deviation source 2 as shown. The operation of the deviation signal sources 1 and 2 will be explained in more detail later with reference to FIG. 2. It must be remembered that in practice there will probably be more than the two input signals and deviation signal sources. While the detailed mechanism of sources 1 and 2 will be explained below, it is sufficient to say that each deviation signal source provides a signal (a voltage or a current) proportional to the deviation of the input signal from a fixed, predetermined signal level. The deviation signal may be positive or negative, depending upon whether the sensed deviation was positive or negative. For example, a positive current or voltage may be used to indicate an increase in the controlled furnace temperature from a predetermined temperature, and a negative current or voltage used to indicate a decrease from that temperature.

The deviation signal from sources 1 and 2 is then fed to a first selecting means, e.g., scanner 3. Scanner 3 is merely a plurality of switches coupled together. For this purpose, conventional stepping switches, reed relays, solid state switches (using field-effect transistors, either insulated-gate or conventional, silicon controlled rectifiers, or transistors), or any other conventional switching mechanisms may be used. Optical scanning systems may also be employed. It is important for this invention that the switching system used for scanner 3 generate as little noise during switching as possible. Scanner 3 selects one deviiation signal at a time from the plurality of deviation signal sources 1 and 2. The selected deviation signal is fed by scanner 3 into the amplifying means, e.g., amplifier 4. Amplifier 4 is a conventional solid-state amplifier. In a preferred embodiment of the invention, amplifier 4 has a bias input 5 used to adjust the amplifier so that it produces a zero-level (null) output in response to a null input signal. A conventional bias adjustment circuit well known in the art may be used.

Resistors 6 and 7 are calibration resistors, and together set the gain of amplifier 4. In a preferred embodiment of the invention, where it is desirable to have a different selected amplifier gain corresponding to each of deviation signal sources 1 and 2, a second selecting means (scanner 8) is employed to select from a plurality gain setting circuits illustrated by circuits 9 and 10. Note that scanner 8 is synchronized (illustrated by the dotted lines) to scanner 3. Accordingly, when scanner 3 selects a deviation signal source 1, scanner 8 will select the corresponding gain set circuit 9. Circuit 9 is a circuit designed to set the gain of amplifier 4 to a predetermined amount corresopnding to the particular input signal to deviation signal source 1. Similarly, when deviation signal source 2 is selected by scanner 3, gain set circuit 10 is selected by scanner 8 to correspond to the signal there being controlled (the input to deviation signal source 2). The resistors in the gain set circuits 9 and 10 combine with calibration resistors 6 and 7 to set the gain of amplifier 4. If desired, gain set circuits 9 and 10 may contain adjustable resistors (potentiometers) so that these gain set circuits may be tailored to the particular type of input signal to the systems when the controller of this invention is to be changed from one system to another. Amplifier 4 may change its gain, for example, from 1,000 to 10,000.

The output signal from amplifier 4 is passed through switching means, or switch 11 to scanner 12. Switch 11 is a conventional relay or switch, for example, a silicon controlled rectifier. It is used for coupling and decoupling the amplifier from the third selecting means (scanner 12) so that amplifier 4 is decoupled during rotation of the scanner, thus eliminating any transient signals caused by such rotation. This switch is designed to be open while scanner 3 is shifting from one deviation signal source to another. By having switch 11 open during scanner movement, transients which result from switching one source to another do not pass into scanner 12. Generally, switch 11 is allowed to remain open for about 1 millisecond after scanner switching has been completed to be sure to eliminate all transients. Switch 11 then closes for a predetermined period of time, for example, 2–30 milliseconds, to pass the amplified deviation signal through scanner 12 to the integrating system (to be explained later). The operation of switch 11 is synchronized with scanners 3, 8 and 12 by timer 13. Timer 13 is a conventional timing mechanism, using, for example, a shift register and clock. Since synchronizing mechanisms are so well known in the art, no further description is believed necessary here.

Scanner 12, synchronized with scanners 3 and 8, selects one of integrating means 14 or 15 corresponding with the selected deviation signal source 1 or 2, and the selected gain circuit 9 or 10. The selected integrating circuit 14 or 15 integrates the signal passed from switch 11 through scanner 12 during the integrating period (while switch 11 is closed) of the switching cycle. This period, as discussed above, may be from about 2 to 30 milliseconds. Integrating circuit 16 is for supplying the signal to adjust the zero point of amplifier 4, and will be explained in more detail later.

Integrating means 14 and 15 are used to integrate the output signal of amplifier 4 while the amplified deviation signal from sources 1 and 2, respectively, passes through switch 11. These integrating means generate an output signal in a manner to be discussed below. This output signal is fed back to a transducer or other mechanism used to correct for the deviation indicated by the selected deviation signal source. For example, if the signal being controlled was obtained from a thermocouple measuring furnace temperature, the output signals from integrating means 14 or 15 are fed to a temperature adjusting mechanism for the furnace. The furnace temperature is to be adjusted in the direction indicated by the deviation signal. It is apparent, after a series of such adjustments, that the deviation signal will be reduced toward zero as the furnace is brought to the proper temperature corresponding to the setting of the deviation signal source. At that time, no further deviation siagnal will result. Accordingly, no further adjustments will be made until a subsequent deviation occurred. During the equilibrium state, the control system of this invention merely acts as a monitor to detect changes from the desired level.

Figure 2:
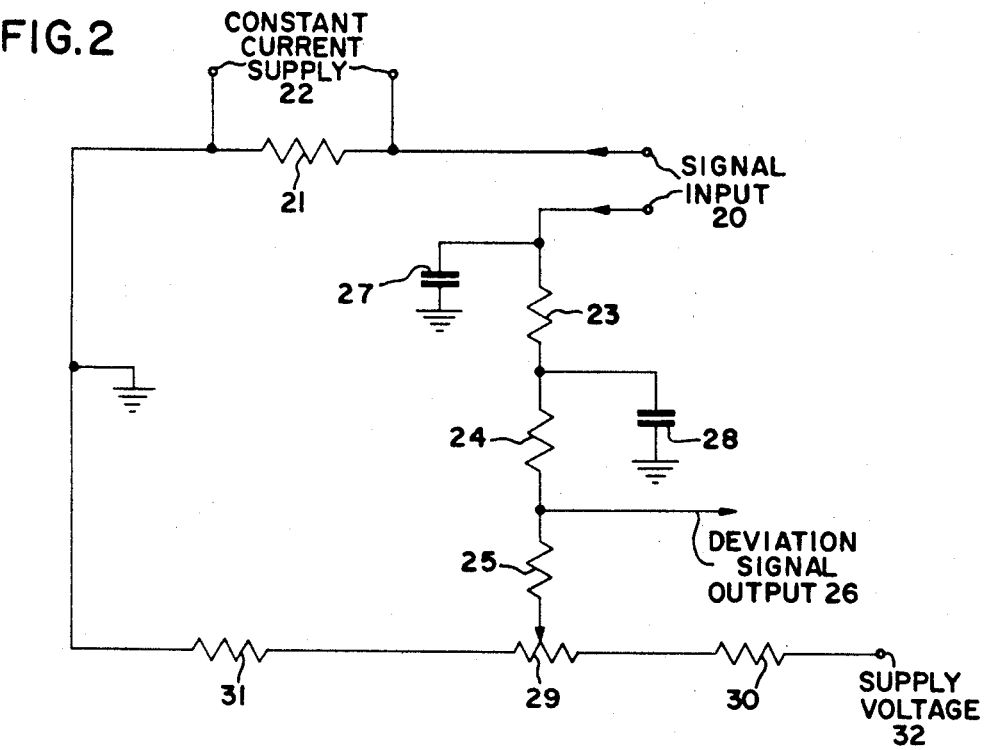
FIG. 2 is a schematic circuit diagram of one of the deviation signal sources of this invention.

Now referring to FIG. 2, the deviation signal sources of this invention will be explained in more detail. Realizing that the input signal to the deviation signal source shown in FIG. 2 may be any type of derived voltage or current generated by the apparatus being controlled, the embodiment shown in FIG. 2 uses for illustration a furnace to be maintained at a constant temperature. Accordingly, the input signal at terminals 20 is derived from a thermocouple located at a desired furnace position. Resistor 21 and terminals 22 (for receiving a constant current from a supply) are part of a conventional cold junction compensator used to correct the thermocouple for changes in room temperature at its connections outside the furnace. The reading from the thermocouple can be affected by changes in the ambient temperature to which the external wires are exposed, such as these changes resulting from changes in room temperature. The conventional cold junction compensator, including resistor 21 and constant current supply terminals 22, corrects for these changes.

Resistors 23, 24, and 25, which may, for example, be 1K ohm, 10K ohm, and 1 megohm, respectively, are balancing resistors used to obtain zero volts at output terminal 26 when the system is in balance. Capacitors 27 and 28 are used as filters for input noise. High frequency noise signals will pass through capacitors 27 and 28 to ground, eliminating them from system. Potentiometer 29 is used to set the desired level of the predetermined constant reference signal for comparison with the input signal at terminals 20. The furnace being controlled in the example illustrated, will be maintained at a temperature determined by the setting of potentiometer 29. The range of settings of potentiometer 29 may be adjusted using calibration resistors 30 and 31. The supply voltage, which may, for example, be 6 volts, is applied to terminal 32.

When potentiometer 29 is set for the desired voltage corresponding to the desired furnace operating temperature, and the furnace is at that temperature, there will be a zero deviation signal at output terminal 26. However, it is not necessary that the equilibrium level be zero volts; any desired voltage may be used, and the system conventionally adjusted accordingly. In the illustrated embodiment, if the furnace temperature drops, terminal 26 becomes negative; if the temperature rises, terminal 26 becomes positive. The voltage on terminal 26 thus comprises the desired deviation signal output from the deviation signal source, which is passed through scanner 3 to amplifier 4, all as shown in FIG. 1.

Figure 3:
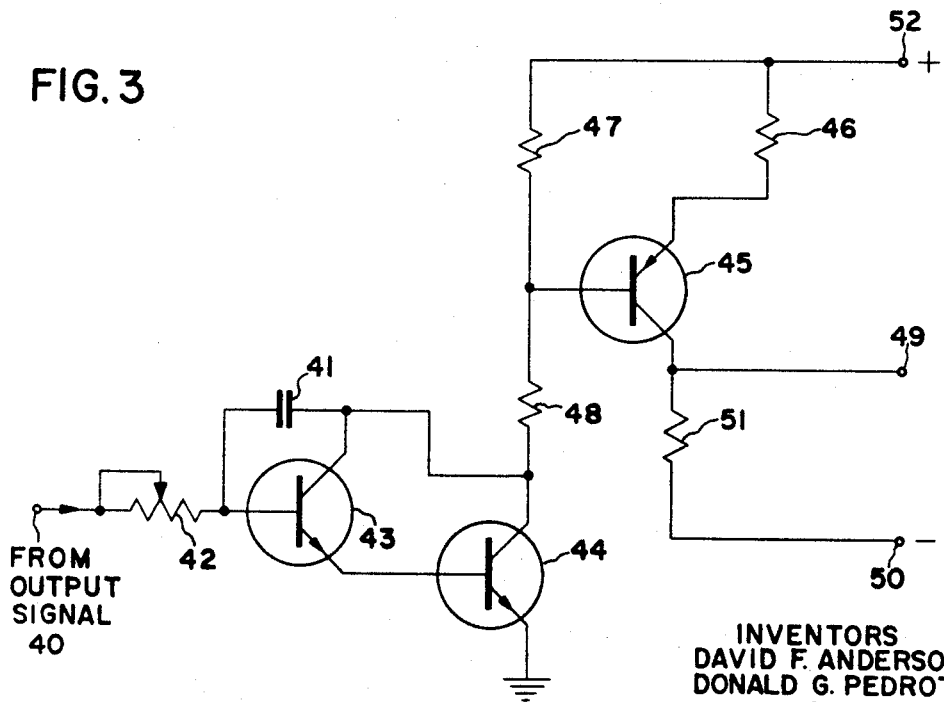
FIG. 3 is a schematic circuit diagram of one of the integrating means of this invention.

The integrating system is a means for integrating the selected deviation signal to produce an output signal having a level proportional to the amount of deviation of the input signal received at the selected input terminal from the constant reference signal. Referring to FIG. 1, the integrating system comes into operation when switch 11 is closed so that the output of amplifier 4 is passed through scanner 12 to the selected one of integrating means 14, 15, or 16. Scanner 12 is a third selecting means coupled between amplifier 4 and the input of each of the integrating means for selecting in rotation one such integrating means and connecting it to the amplified deviation signal appearing at the amplifier output. Referring to FIG. 3, the signal to the integrating means will be passed to the input terminal 40. Capacitor 41 then charges or discharges as a result of the signal applied to terminal 40 for the duration of its application. The charging or discharging rate is determined by potentiometer 42 and the size of capacitor 41 itself. Potentiometer 42 may be adjusted to change the rate of charging of capacitor 41. The amount of charge received, of course, depends upon the selected amount of time for which switch 11 (FIG. 1) is closed during each charging cycle of the integrating means. Depending on whether the input signal to terminal 40 is positive or negative, capacitor 41 may either charge or discharge. If the charge on capacitor 41 remains constant during signal application, no deviation signal appeared in the portion of the system being monitored during that particular cycle.

Transistors 43 and 44 are conventional amplifier transistors used to amplify the charge current used to charge capacitor 41. The emitter-base cascade connection between transistors 43 and 44 is conventional, and needs no further explanation here. Transistor 45 and its associated resistors 46, 47, and 48 are used as a current amplifier to amplify the output current emerging from charged capacitor 41. A positive bias voltage applied to terminal 52 is connected to the emitter of transistor 45 through resistor 46. This amplified output current from capacitor 41 is inversely proportional to the charge on capacitor 41. The collector of transistor 45, connected to terminal 49, provides the desired output current signal proportional to the charge on capacitor 41. If a voltage rather than a current output signal is required, such a signal may be taken between terminals 49 and 50 across output resistor 51. Either the output current at terminal 49 or the output voltage across terminals 49 and 50 may be used as the output signal from the system which is used to operate a transducer or other conventional mechanism to adjust the unit being controlled in the direction which will eliminate the deviation signal. For example, in the illustrated application of the system of the invention, where an increase in furnace temperature resulted in a positive deviation signal output, the resulting output signal from the integrating means of FIG. 3 is connected to an automatic variable transformer, for example, to reduce its temperature slightly. If, on the next scanning cycle a positive deviation signal were still monitored, further adjustment of the same transformer to cause a further decrease in furnace temperature would be triggered by the signal from the integrating means of FIG. 3. This continual adjustment will go on until the furnace reaches the proper temperature, at which time there would no longer be any deviation signal. Then the output signal from the integrating means of FIG. 3 will similarly be zero, and no further adjustment will be required or made.

Referring again to FIG. 1, a preferred embodiment of the invention uses an additional integrating means 16 connected to be scanned with the other integrating means by scanner 12 for continual bias monitoring and adjustment of amplifier 4 during one portion of the scanning cycle. With a null input signal, a null amplified output signal would be expected. However, if the amplifier has drifted out of bias adjustment, and provides a positive or negative output signal, such a signal will be passed from the output of amplifier 4 to scanner 12, and be integrated by zero adjust integrating means 16. The output signal from integrating means 16 which is proportional to the amplifier drift, is then fed back to the bias adjustment input of amplifier 4, as shown, to adjust the bias in the direction to bring the output back to null. Thus in each operating cycle, amplifier 4 is monitored to assure proper bias. This feature greatly enhances the accuracy of the control system of this invention.

From the above description, it is apparent that the system of this invention makes maximum use of a single amplifier. By continuous monitoring and adjustment of this amplifier, and by the elimination of separate preamplifiers for each input signal, the noise level of the system is greatly reduced, and its accuracy concomitantly increased. Even though the input signal level may be as low as 1 microvolt, the system can tolerate noise levels as high as 30 microvolts. Requiring substantially less equipment, the control system of this invention provides a significant improvement over those of the prior art.

The above description is directed only to preferred or illustrative embodiments of the invention. Therefore, it should not be considered as placing any limitations on the scope of the invention which are not set forth in the claims which follow.

What is claimed is:
1. Apparatus for controlling a plurality of signals using a single amplifying means which comprises:
   a plurality of input terminals, one for receiving each signal to be controlled;
   a reference signal source having a predetermined constant signal level;
   a plurality of deviation signal sources for comparing the signal received at each input terminal with the signal level of a reference signal source, and for developing a deviation signal proportional to the deviation of the signal level received at the input termi- nal from the predetermined constant signal level of the signal source;

a first selecting means coupled to the output of each of said deviation signal sources for selecting in rotation one such deviation signal from one of said deviation signal sources at a time;

an amplifying means;

a means for directly coupling the selected unamplified deviation signal to said amplifying means;

a plurality of means for integrating any selected deviation signal at the output of said amplifying means and for providing a signal level proportional to the amount of deviation from the reference signal source of the received signal at the selected input terminal; and a means for adjusting the corresponding signal to be controlled an amount proportional to the integrated deviation signal, thereby maintaining in rotation each signal to be controlled at a constant level proportional to a constant signal source.

2. The apparatus of claim 1 further characterized by the addition of a second selecting means coupled between said amplifying means and the input of each of said integrating means for selecting in rotation one such integrating means and connecting to it the amplified deviation signal from said amplifying means.

3. The apparatus of claim 1 further characterized by the addition of a means for adjusting the gain of said amplifying means when a selected gain setting circuit is connected thereto, and a second selecting means for connecting to said amplifying means the gain setting circuit associated with the deviation signal source selected by said first selecting means, thereby choosing the gain of said amplifying means to correspond to the selected signal to be controlled.

4. The apparatus of claim 1 further characterized by the addition of a means for supplying a null input signal to said amplifying means; and adjusting means for adjusting the output of said amplifier to obtain a null output signal with a null input signal, an additional integrating means connected to be rotated in succession with the other integrating means, said additional integrating means being connected to the output of said amplifying means when a null input signal is supplied to the input of said amplifying means, said additional integrating means providing a signal level proportional to the output of said amplifying means when a null input sign is applied, and a means coupled to the bias adjusting means of said amplifier to adjust same towards a null output upon receipt of a deviation signal from said additional integrating means.

5. Apparatus for controlling a plurality of signals using a single amplifying means which comprises:

a plurality of input terminals, one for receiving each signal to be controlled;

a reference signal source having a predetermined constant signal level;

a plurality of deviation signal sources for comparing the signal received at each input terminal with the signal level of a reference signal source, and for developing a deviation signal proportional to the deviation of the signal level received at the input terminal from the predetermined constant signal level of the signal source;

a first selecting means coupled to the output of each of said deviation signal sources for selecting in rotation one such deviation signal from one of said deviation signal sources at a time;

an amplifying means;

a means for directly coupling the selected unamplified deviation signal to said amplifying means;

a means for adjusting the gain of said amplifying means when a selected gain-setting circuit is connected thereto;

a second selecting means for connecting to said amplifying means the gain setting circuit associated with the deviation signal source selected by said first selecting means, thereby choosing the gain of said amplifying means to correspond to the selected signal to be controlled;

a plurality of means for integrating the selected deviation signal at the output of said amplifying means, one integrating means corresponding to each deviation signal source, and for providing a signal level proportional to the amount of deviation from the reference signal source of the received signal at the selected input terminal;

a third selecting means coupled between said amplifying means and the input of each of said integrating means for selecting in rotation one such integrating means and connecting to it the amplified deviation signal from said amplifying means;

a switching means for coupling and decoupling said amplifying means from said selecting means so that said amplifying means is decoupled during the rotation of said selecting means, thus eliminating transient signals caused by such rotation; and a means for adjusting the corresponding signal to be controlled an amount proportional to the integrated deviation signal, thereby maintaining in rotation each signal to be controlled at a constant level proportional to a constant signal source.

6. The apparatus of claim 5 further characterized by the addition of a means for supplying a null input signal to said amplifying means; and adjusting means for adjusting the output of said amplifier to obtain a null output signal with a null input signal, an additional integrating means connected to be rotated in succession with the other integrating means, said additional integrating means being connected to the output of said amplifying means when a null input signal is supplied to the input of said amplifying means, said additional integrating means providing a signal level proportional to the output of said amplifying means when a null input sign is applied, and a means coupled to the bias adjusting means of said amplifier to adjust same towards a null output upon receipt of a deviation signal from said additional integrating means.

References Cited

UNITED STATES PATENTS

| 3,087,101 | 4/1963 | Lovejoy | 318 |
| 3,150,302 | 9/1964 | Baumoel | 318 |
| 3,274,576 | 9/1966 | Guignard. | |

ROBERT L. GRIFFIN, *Primary Examiner.*

W. S. FROMMER, *Assistant Examiner.*